US012679109B2

(12) United States Patent
Herrmann et al.

(10) Patent No.: US 12,679,109 B2
(45) Date of Patent: Jul. 14, 2026

(54) SYSTEM AND METHOD FOR APPLYING PRIMER TO DIFFERENT SIZES OF MEDIA IN INKJET PRINTERS

(71) Applicant: Xerox Corporation, Norwalk, CT (US)

(72) Inventors: Douglas K. Herrmann, Webster, NY (US); Jason M. LeFevre, Penfield, NY (US); Seemit Praharaj, Webster, NY (US); Varun Sambhy, Pittsford, NY (US); Anthony S. Condello, Webster, NY (US); Palghat S. Ramesh, Pittsford, NY (US); Jorge A. Alvarez, Webster, NY (US); Peter M. Gulvin, Webster, NY (US); Christine Steurrys, Williamson, NY (US); Mark Petropoulos, Webster, NY (US); Brian Lindstrom, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 216 days.

(21) Appl. No.: 18/436,518

(22) Filed: Feb. 8, 2024

(65) Prior Publication Data

US 2025/0256516 A1 Aug. 14, 2025

(51) Int. Cl.

| | |
|---|---|
| ***B41J 11/00*** | (2006.01) |
| ***B41J 2/01*** | (2006.01) |
| ***B41J 27/12*** | (2006.01) |

(52) U.S. Cl.

CPC ............. *B41J 11/0015* (2013.01); *B41J 2/01* (2013.01); *B41J 27/12* (2013.01)

(58) Field of Classification Search

CPC ........... B41J 11/0015; B41J 2/01; B41J 27/12

USPC .......................................................... 347/101

See application file for complete search history.

(56) References Cited

U.S. PATENT DOCUMENTS

| | | | | |
|---|---|---|---|---|
| 5,698,989 | A | 12/1997 | Nulman | |
| 9,403,383 | B1 * | 8/2016 | Liu | B41J 11/00214 |
| 2015/0138295 | A1 | 5/2015 | Lindner et al. | |
| 2019/0054749 | A1 * | 2/2019 | Kanno | G03G 15/1615 |
| 2019/0337310 | A1 | 11/2019 | Praharaj | |

OTHER PUBLICATIONS

Canon Solutions America. Hello, I'm the New VarioPrint i-Series+, https://pps.csa.canon.com/sites/default/files/2023-04/Hello-Im-the-New-VarioPrint-i-series-plus-BR_0.pdf. Accessed Jan. 9, 2024.

* cited by examiner

*Primary Examiner* — Jason S Uhlenhake
*Assistant Examiner* — Alexander D Shenderov
(74) *Attorney, Agent, or Firm* — Maginot Moore & Beck LLP

(57) ABSTRACT

An inkjet printer includes a stationary roller and a second roller to apply primer onto media before the media is printed. The second roller is movable in a cross-process direction so the combined length of the stationary roller and the second roller in the cross-process direction can apply primer to the full width of the media being printed.

30 Claims, 5 Drawing Sheets

SYSTEM AND METHOD FOR APPLYING PRIMER TO DIFFERENT SIZES OF MEDIA IN INKJET PRINTERS

TECHNICAL FIELD

This disclosure relates generally to devices that produce ink images on media, and more particularly, to the application of primers to media in such printers prior to printing the media.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content that define the images. The actuators in the printheads respond to the firing signals by expanding into an ink chamber fluidly connected to a nozzle to eject ink drops from the nozzle onto an image receiving surface to form an ink image that corresponds to the digital image content used to generate the firing signals. The image receiving surface is usually a continuous web of media material or a series of media sheets.

Inkjet printers used for producing color images typically include multiple printhead modules. Each printhead module includes one or more printheads that typically eject a single color of ink. In a typical inkjet color printer, four printhead modules are positioned in a process direction with each printhead module ejecting a different color of ink. The four ink colors most frequently used are cyan, magenta, yellow, and black. The common nomenclature for such printers is CMYK color printers. Some CMYK color printers have two printhead modules that print each color of ink. The printhead modules that print the same color of ink are offset from each other by one-half of the distance between adjacent inkjets in a printhead in a cross-process direction to double the number of pixels per inch to increase the density of a line of the color of ink ejected by the printheads in the two modules. As used in this document, the term “process direction” means the direction of movement of the image receiving surface as it passes the printheads in the printer and the term “cross-process direction” means a direction that is perpendicular to the process direction in the plane of the image receiving surface.

The image quality of aqueous ink images printed onto various types of media varies according to the type of media being printed. Image quality is typically excellent when the aqueous ink is printed onto offset coated, non-glossy media because the ink remains on top of the coating. Aqueous ink printing onto uncoated, porous media, however, produces washed out looking images because the inks are absorbed into the fibers of the paper. To avoid this consequence, coatings are applied to porous media to reduce the absorption of the inks into the media. As used in this document, the term “primer” means liquid coatings that are applied to media to improve the image quality of the ink images over that which is achieved without the coatings. Primers reduce the interaction of the inks with the media since the primer is interposed between the media and the inks. Because the ink image is fixed to the primer layer rather than the media, the ink image can be more easily removed. The case of ink image removal from media is a significant factor in recycling printed media.

Primer is applied to coated media in one of two ways. In some printers, primer is applied to a single roller that extends across the widest extent of the media transport path in the cross-process direction. This roller is brought into contact with the media as the media passes the roller, and the primer is transferred to the media. The second method of applying primer uses a printhead that is fluidly coupled to a supply of primer and the printhead is operated in a manner similar to when the printhead is operated to eject ink drops onto media. The roller method is simpler than the printhead method but the printhead method enables only those areas where is to be ejected to be coated. Thus, the printhead method is more efficient. Additionally, if the media being treated is narrower in the cross-process direction than the media transport path, then primer is applied to the belt being carried by the media transport. The primer on the belt can have a detrimental impact on the belt surface or on the reverse side of media when wider media is later treated. Thus, inkjet printers would benefit from being able to treat different widths of media with primers without applying primers to the media transport belt.

SUMMARY

A new color inkjet printer is configured to treat different widths of media with primers without applying primer to the media transport belt. The color inkjet printer includes at least one printhead; a media transport for moving a media sheet through a print zone opposite the at least one printhead in a process direction; and a primer applicator having: a supply of primer; a stationary roller fluidly connected to the supply of primer; a second roller positioned parallel to the stationary roller; and an actuator operatively connected to one end of the second roller, the actuator being configured to move the second roller bidirectionally in a cross-process direction over a media transport path.

A new primer applicator is configured to be positioned before a print zone in an inkjet printer to treat different widths of media with primers without applying primer to the media transport belt. The primer applicator includes a supply of primer; a stationary roller fluidly connected to the supply of primer; a second roller positioned parallel to the stationary roller; and an actuator operatively connected to one end of the second roller, the actuator being configured to move the second roller bidirectionally in a cross-process direction over a media transport path.

A new method of operating a color inkjet printer treats different widths of media with primers without applying primer to the media transport belt. The method includes operating a media transport to move a plurality of media sheets through a print zone opposite at least one printhead in a process direction; supplying primer to a stationary roller positioned opposite the media transport and before the media sheets pass the at least one printhead; and moving a second roller bidirectionally in a cross-process direction over the media transport, the second roller being positioned opposite the media transport and before the media sheets pass the at least one printhead.

BRIEF DESCRIPTION OF THE DRAWINGS

The foregoing aspects and other features of a color inkjet printer and color inkjet printer operational method that is able to treat different widths of media with primers without applying primer to the media transport belt are explained in the following description, taken in connection with the accompanying drawings.

DETAILED DESCRIPTION

Figure 1:
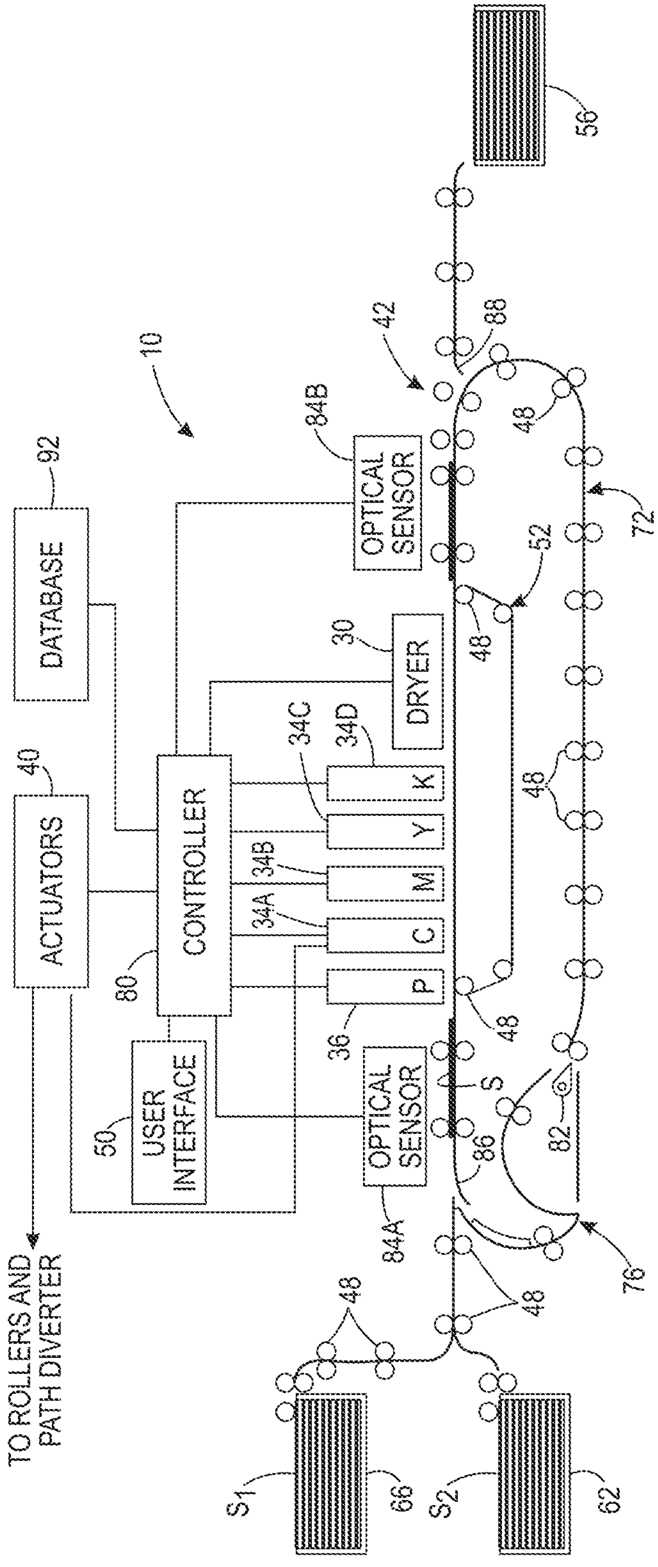
FIG. 1 is a schematic drawing of a color inkjet printer that is able to treat different widths of media with primers without applying primer to the media transport belt.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

The inkjet printer described below coats media with a primer using an adjustable roller system to apply primer to the surface of the media. The primer, also referred to as a precoat composition, precoat, primer, or primer solution, is a metal salt solution that "crashes" or precipitates the pigments in the ink composition and prevents it from sinking or diffusing into the bulk of the media. The use of a metal salt solution as a primer has several advantages, including low material cost and the ability to improve print quality on both coated and uncoated paper. The effect of "crashing," precipitating, or causing the precipitation of a component of an ink can include any single chemical or combination of chemicals in relation to a printing ink or other printing related fluid that can facilitate the precipitation of one or more components in the ink. This precipitation is thought to be caused by component associations induced by a combination of the primer and/or component associations occurring with the primer.

Exemplary primers can be made with reference to the following table:

| Representative Primer Solution | | | |
|---|---|---|---|
| Chemical | Amt (g) | % by Wt | Percentage Range |
| Glycerol | 21.8 | 2.2 | 0-5 |
| Propylene Glycol, (but can also include other cosolvents like butanediol, pentanediol, hexanediol, glycol ethers like Diethylene Glycol Monoethyl Ether, Dipropylene Glycol Methyl Ether and other cosolvents present in ink) | 197.7 | 19.8 | 10-40 |
| Water | 509 | 50.9 | 30-70 |
| Magnesium Nitrate Hexahydrate (but could also include other Ca or Al salts) | 270 | 27.0 | 10-50 |
| Surfactant TT4000 (surfactants will similar characteristics can be used) | 7 | 0.7 | 0.1-3 |
| Biocide Proxel | 1.45 | 0.1 | 0.1-1 |
| | 1006.95 | 100.7 | |

Such primers are not adhesives, sealers, suspensions, or the like that have been previously used in inkjet printers to treat media prior to printing.

FIG. 1 depicts a high-speed color inkjet printer 10 that uses multiple application roller system to apply primer to media sheets in the printer before the media are printed. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads or a linear array of printheads that abut one another to enable media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

With further reference to FIG. 1, the printed image exits the print zone of printer 10 and passes under an image dryer 30 after the ink image is printed on a sheet S. As used in this document, the term "print zone" means an area of a media transport opposite the printheads of an inkjet printer. The image dryer 30 can include an infrared heater, a heated air blower, air returns, or combinations of these components to heat the ink image and at least partially fix an ink image to the sheet S. An infrared heater applies infrared heat to the printed image on the surface of the sheet S to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

Prior to reaching the print zone, the media passes beneath a primer application module 36. A view through the primer application module 36 is presented in FIG. 2A. This view is from the perspective of a viewer about the primer application module 36 so the viewer sees the components of the primer application module 36 as well as the vacuum belt of the media transport path 42 and the printheads 56 within printhead module 34A arranged in a staggered array as previously described. The primer application module 36 includes at least a pair of rollers covered in a porous material 44 that is fluidly connected to a pressurized source of primer. One roller 38 is stationary and has a length L1 that is equal to the width in the cross-process direction CP of the narrowest media on which the printer forms ink images. The inboard (IB) end of the roller 38 is positioned to correspond with the inboard (IB) edge of the narrowest media moving in the process direction P. At least one other roller 48 includes a piston 52 mounted to an outboard end of a shaft 42. The piston 52 is fixedly mounted to the inner circumference of the wall forming roller 48 within its interior. The inboard (IB) end of the piston 52 is connected to one of the actuators 40 that is configured to move the piston 52 and the roller 48 bidirectionally in the cross-process direction CP. The outboard (OB) end of the piston 52 is fixed to the inner circumference of the wall of the roller 48 so movement of the piston 52 carries the roller 48 with it. The roller 48 is also covered in the porous material 44 that is fluidly connected to the primer source but in FIG. 2A, the porous material 44 and the roller 48 are depicted as being transparent to facilitate the understanding of the primer application module 36. The portions of the rollers 38 and 48 covered by the porous material 44 include perforations in them to permit the egress of primer from the roller into the porous material 44 for application to the media sheets as explained in more detail below. The porous material 44 can be any type of absorbent material that facilitates the uptake of primer from the volume defined by the walls of the rollers 38 and 48. Examples of appropriate absorbent materials include porous XF neoprene, microcell, porous EPDM, and the like. These materials are effective in pulling the metal salt solution of the primer from the internal channel within the roller to the surface of the porous material.

Figure 2A:
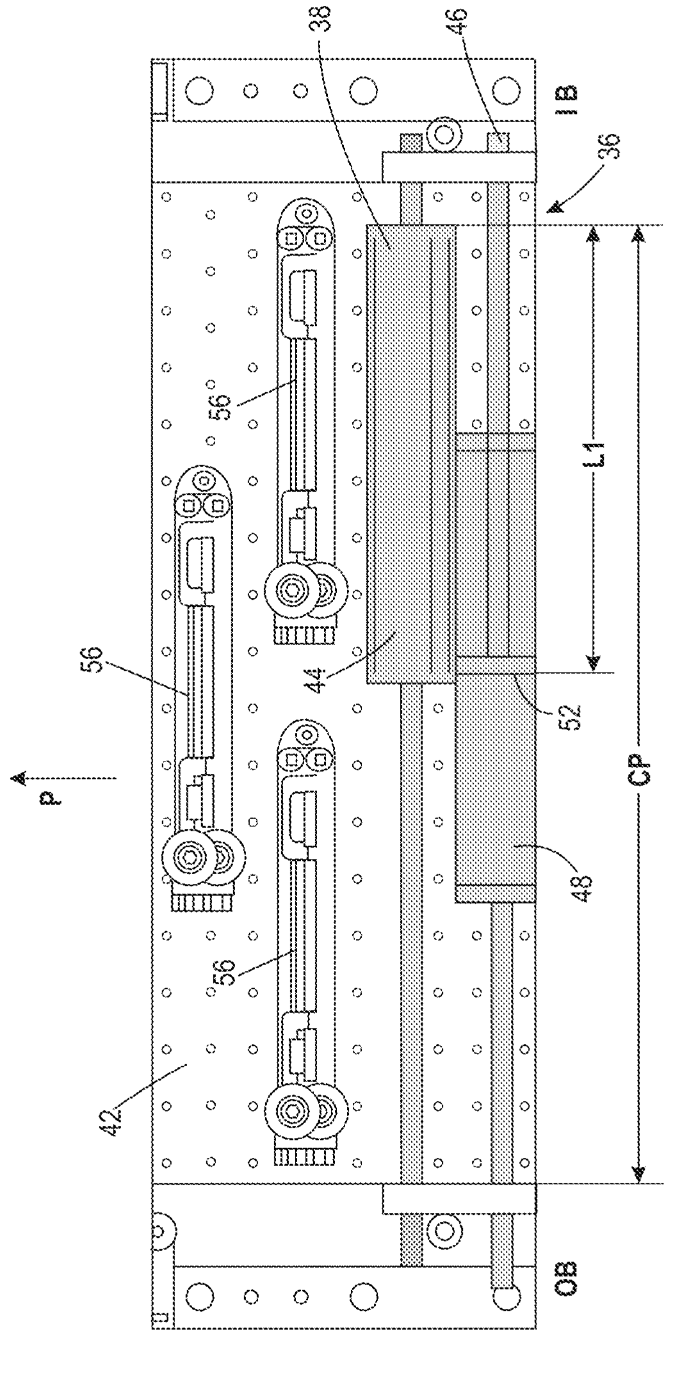
FIG. 2A is a top view of a new primer applicator that depicts a movable piston within the primer application roller to vary the width of the primer application and FIG. 2B is a top view of the new primer applicator without the transparency that reveals the piston.
Figure 2B:
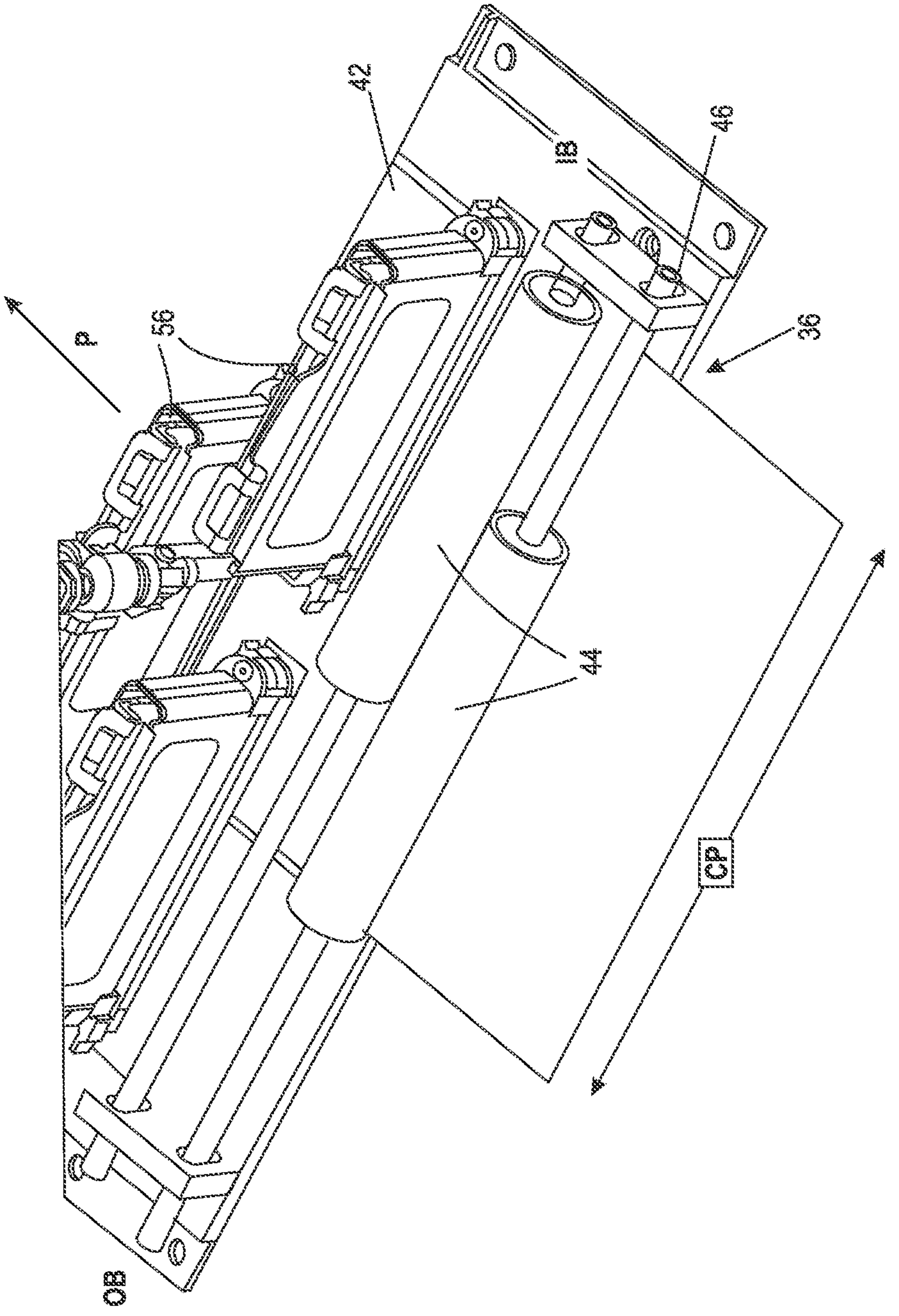

As shown in FIG. 2A and FIG. 2B, the porous material is configured as a cylinder that can be mounted over the respective rollers. As noted above, the piston 52 is mounted to the end of the shaft 40 and is fixedly attached to the inner circumference of the wall forming the roller 48. The length L2 of the roller 48 corresponds to the additional length beyond L1 required to correspond to the widest media in the cross-process direction CP that the printer can print so when the piston 52 is extended to its full length then the sum of the length of the rollers 38 and 48 (L1+L2)=Width of the media transport path 42 in the cross-process direction CP. The controller 80 operates the actuator 40 to move the piston 52 so the length of the roller 48 that extends beyond the outboard (OB) end of the roller 38 corresponds to the width of the media currently being printed. FIG. 2B shows the roller 48 being positioned by operation of the actuator 40 to apply primer to media sheets between the widest media that can be printed and the narrowest media that can be printed. Additionally, the piston 52 and roller 48 are not visible in this figure since the porous material 44 is not depicted as being transparent.

With further reference to FIG. 1, a return path 72 is provided to receive a sheet from the media transport 42 after a substrate has been completely or partially printed and passed through the dryer 30. The sheet is moved by the rotation of pulleys in a direction opposite to the direction of movement in the process direction past the printheads. An actuator 40 operatively connected to pivot 88 is operated by the controller 80 to either block entry to the return path 72 and direct the media to the receptacle 56 or direct the media to the return path 72. At position 76, the substrates on the return path 72 can either be turned over so they can merge into the job stream being carried by the media transport 42 and the opposite side of the media sheet can be printed or left as they are so the printed side of the sheet can be printed again. To leave the sheets as they are, the controller 80 operates an actuator to turn pivot 82 counterclockwise from the position shown in the figure so the sheets bypass the bend in the return path and are directed to position 76 without being turned over. Thus, the printed side of the sheet can be printed. If the controller 80 operates the actuator to turn pivot 82 clockwise to the position depicted in the figure, then the sheet goes over the bend and is flipped before being returned to the transport path 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84B. The optical sensor 84B generates image data of the printed sheets and this image data is analyzed by the controller 80 to detect streakiness in the printed images on the media sheets of a print job. Additionally, sheets that are printed with test pattern images are printed at intervals during the print job. Image data of these test pattern images generated by optical sensor 84B are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the correct mass or landing at an errant position is called an inoperative inkjet in this document. The controller can store data identifying the inoperative inkjets in database 92 operatively connected to the controller 80. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. For sheets that are not inverted and merged into the job stream by the operation of pivoting member 86, optical sensor 84A generates image data of the printed side and the controller 80 uses that image data to register the sheets and to operate the ejectors in the printhead to further print images on the previously printed sheet sides. The optical sensors 84A and 84B can be a digital camera, an array of LEDs and photodetectors, or other devices configured to generate image data of a passing surface. While FIG. 1 shows the printed sheets as being collected in the sheet receptacle 56, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 36, 34A-34D (and thus the printheads), the detector 38, the actuators 40, and the image dryer 30. The ESS or controller 80, for example, is a self-contained computer having a central processor unit (CPU) operatively connected to non-transitory, computer readable media, such as electronic data storage, and a display or user interface (UI) 50. The ESS or controller 80, for example, includes a sensor input and control circuit as well as a pixel placement and control circuit. In addition, the controller 80 reads, captures, prepares, and manages the image data flow between image input sources, such as a scanning system or an online or a work station connection (not shown), and the printhead modules 36 and 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in non-transitory, computer readable medium associated with the processors or controllers. The processors, their memories, and interface circuitry configure the controllers to perform the operations described below when the programmed instructions in the non-transitory, computer readable media are executed. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 36 and 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term “print job parameters” means non-image content data for a print job and the term “image content data” means digital data that identifies an ink image to be printed on a media sheet.

Figure 3:
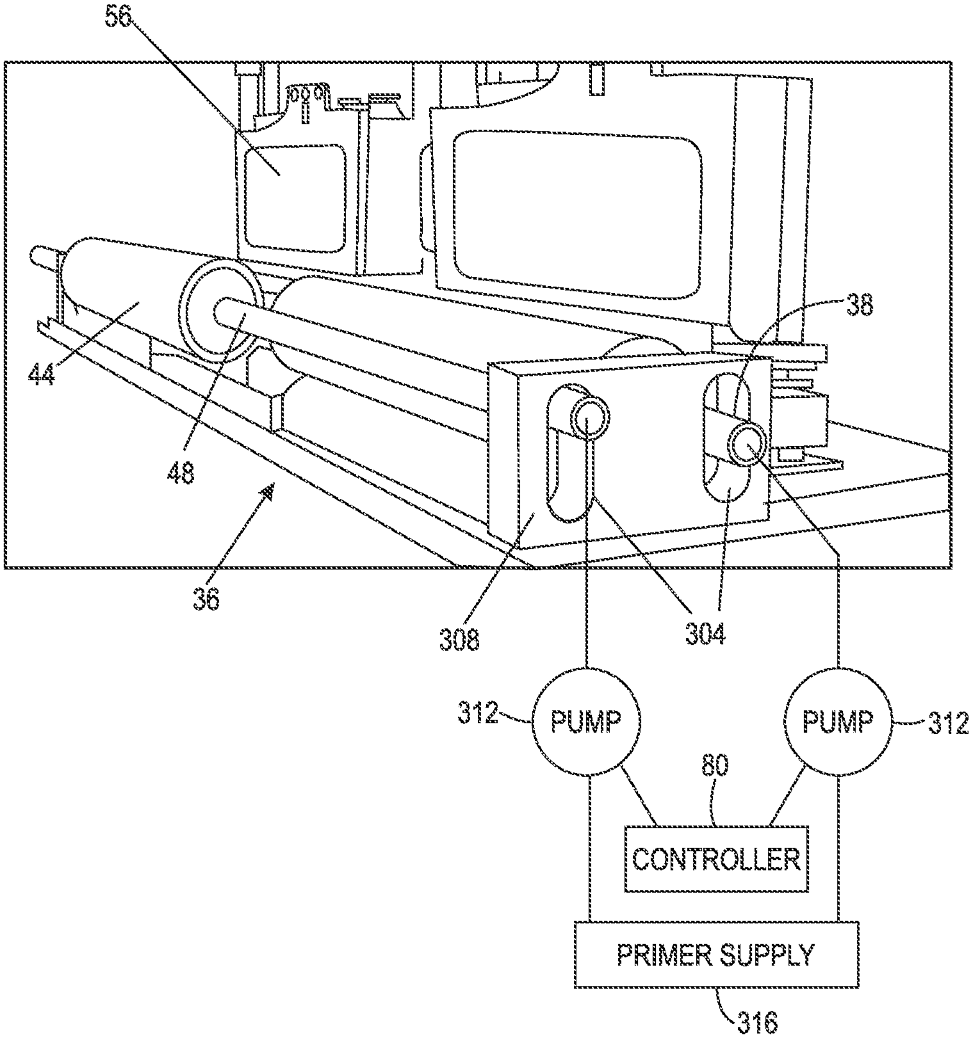
FIG. 3 shows fluid connections to the primer applicator rollers for supplying the primers to the rollers and slots in the roller frames that enable the rollers to move into and out of engagement with the media being treated.

An end view of the primer application module 36 is shown in FIG. 3. Frame end blocks 308 are positioned on the inboard and outboard sides of the module but only the inboard frame end block is visible in FIG. 3. Within each frame end block 308 are two slots 304 through which the ends of the rollers 38 and 48, respectively, extend. These ends are fluidly connected to the output of pumps 312 and the inputs to the pumps 312 are fluidly connected to a primer supply 316, which includes a housing having an internal volume that can be filled with primer. Controller 80 independently operates the pumps 312 to move primer into the rollers 38 and 48 and this primer is urged through the perforations in the rollers to push the primer into the porous material 44 mounted about the rollers. When only the narrowest media is being printed, the controller 80 does not operate the pump 312 fluidly connected to the roller 48. Additionally, the controller 80 operates an actuator 40 operatively connected to the inboard end of the roller 48 to move the roller 48 away from the media transport 42 so primer is not applied to the vacuum belt of the transport 42. Similarly, the controller 80 operates an actuator 40 operatively connected to the inboard end of the roller 38 to move the roller 38 away from the media transport 42 between media sheets so primer is not applied to the vacuum belt of the transport 42 in the inter-document gap between media sheets. This manner of operation ensures that primer is only applied to the cross-process width of each media sheet passing by the primer application module 36.

Figure 4:
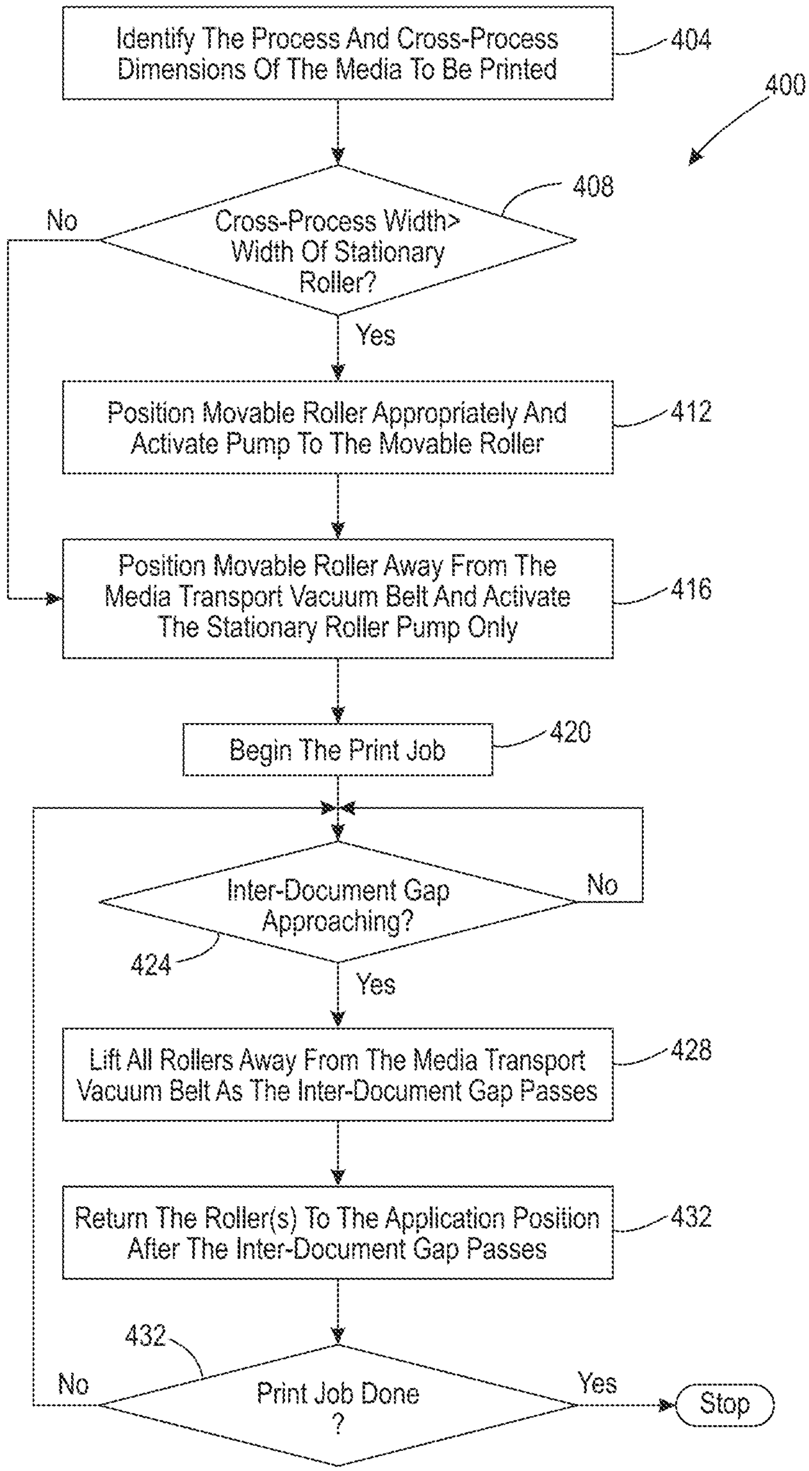
FIG. 4 is a flow diagram of a process for operating the inkjet printer of FIG. 1.

A process 400 for operating the inkjet printer of FIG. 1 to apply primer to different widths of media sheets is shown in FIG. 4. In the description of the process, statements that the process is performing some task or function refers to a controller or general purpose processor executing programmed instructions stored in non-transitory computer readable medium operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to perform one or more tasks or functions described herein. Additionally, the steps of the method may be performed in any feasible chronological order, regardless of the order shown in the figures or the order in which the processing is described.

The process 400 of FIG. 4 begins by identifying the dimensions of the media to be printed in the print job parameters (block 404). Prior to the commencement of the print job, the process determines whether roller 48 is to be moved to correspond to the cross-process width of the media (block 408). If it does, then the roller is moved to the appropriate cross-process direction position and the pump to provide primer to the roller is activated (block 412). Otherwise, the roller 48 is lifted in its slot 304 to prevent the inadvertent application of primer to the outboard portion of the vacuum belt of the media transport and only the pump supplying primer to roller 38 is activated (block 416). The print job then starts (block 420) and the process uses the length of the media in the process direction to determine when an inter-document gap is approaching (block 424). When an inter-document gap is approaching, the roller 38 alone or both rollers 38 and 48 are lifted to prevent the application of primer to the vacuum belt of the media transport when the inter-document gap passes by the rollers (block 428), then return the roller(s) to the application position (block 432). This operation continues until the print job is finished (block 436).

It will be appreciated that variants of the above-disclosed and other features, and functions, or alternatives thereof, may be desirably combined into many other different systems or applications. For example, while the embodiment described in this application uses two roller to cover the length of the media transport path in the cross-process direction, more than two movable rollers could be used with the stationary roller. Various presently unforeseen or unanticipated alternatives, modifications, variations, or improvements therein may be subsequently made by those skilled in the art, which are also intended to be encompassed by the following claims.

What is claimed is:

1. An inkjet printer comprising:
- at least one printhead;
- a media transport for moving a media sheet defining a plane through a print zone opposite the at least one printhead in a process direction; and
- a primer applicator having:
  - a supply of primer;
  - a stationary roller fluidly connected to the supply of primer;
  - a second roller positioned parallel to the stationary roller; and
  - an actuator operatively connected to one end of the second roller, the actuator being configured to move the second roller bidirectionally in a cross-process direction over a media transport path, wherein the cross-process direction is perpendicular to the process direction and parallel to the plane.

2. The inkjet printer of claim 1, the stationary roller and the second roller further comprising:

a plurality of perforations in a wall of the stationary roller and a plurality of perforations in a wall of the second roller, the wall of the stationary roller defining a first volume configured to receive primer from the supply of primer and the wall of the second roller defining a second volume configured to receive primer from the supply of primer;

a first cylinder of porous material configured to mount over the plurality of perforations in the stationary roller; and a second cylinder of porous material configured to mount over the plurality of perforations in the second roller, the first and the second cylinders of porous material being configured to pull primer from the first volume and the second volume, respectively, to a surface of the first and the second cylinders of porous material.

3. The inkjet printer of claim 2 wherein the porous material is porous XF neoprene, microcell, or porous EPDM.

4. The inkjet printer of claim 3 further comprising:

a first pump fluidly connected to the supply of primer and to the volume within the stationary roller, the first pump being configured to move primer from the supply of primer into the volume within the stationary roller; and a second pump fluidly connected to the supply of primer and to the volume within the second roller, the second pump being configured to move primer from the supply of primer into the volume within the second roller.

5. The inkjet printer of claim 4 further comprising:

a piston having a first end and a second end, the first end being operatively connected to the actuator and the second end being fixedly mounted to the wall of the second roller within the volume formed by the wall of the second roller.

6. The inkjet printer of claim 5 further comprising:

a controller operatively connected to the actuator, the controller being configured to:

identify a width of media to be printed in the cross-process direction; and operate the actuator to move the piston to position the second roller so a length of the stationary roller and a length of the second roller that extends beyond a terminal end of the stationary roller corresponds to the identified width of the media to be printed in the cross-process direction.

7. The inkjet printer of claim 6 further comprising:

a second actuator operatively connected to the first end of the piston, the second actuator being configured to raise the second roller; and the controller being further configured to:

operate the second actuator to raise the second roller in response to the identified width of the media to be printed is equal to the length of the stationary roller.

8. The inkjet printer of claim 7 wherein the length of the stationary roller is equal to a narrowest width of media in the cross-process direction to be printed by an inkjet printer.

9. The inkjet printer of claim 8 further comprising:

a third actuator operatively to the stationary roller, the third actuator being configured to raise the stationary roller; and the controller being further configured to:

to identify positions of inter-document gaps between media sheets in a stream of media sheets being printed by the inkjet printer; and operate the second actuator and the third actuator to raise the second roller and the stationary roller, respectively, in response to the identified positions of the inter-document gaps passing the stationary roller and the second roller in a process direction.

10. The inkjet printer of claim 9, the controller being operatively connected to the first pump and the second pump, the controller being configured to operate the first pump and the second pump independently of each other.

11. A primer applicator for an inkjet printer comprising:

a supply of primer;

a stationary roller fluidly connected to the supply of primer;

a second roller positioned parallel to the stationary roller; and an actuator operatively connected to one end of the second roller, the actuator being configured to move the second roller bidirectionally in a cross-process direction parallel to the stationary roller over a media transport path.

12. The primer applicator of claim 11, the stationary roller and the second roller further comprising:

a plurality of perforations in a wall of the stationary roller and a plurality of perforations in a wall of the second roller, the wall of the stationary roller defining a first volume configured to receive primer from the supply of primer and the wall of the second roller defining a second volume configured to receive primer from the supply of primer;

a first cylinder of porous material configured to mount over the plurality of perforations in the stationary roller; and a second cylinder of porous material configured to mount over the plurality of perforations in the second roller, the first and the second cylinders of porous material being configured to pull primer from the first volume and the second volume, respectively, to a surface of the first and the second cylinders of porous material.

13. The primer applicator of claim 12 wherein the porous material is porous XF neoprene, microcell, or porous EPDM.

14. The primer applicator of claim 13 further comprising:

a first pump fluidly connected to the supply of primer and to the volume within the stationary roller, the first pump being configured to move primer from the supply of primer into the volume within the stationary roller; and a second pump fluidly connected to the supply of primer and to the volume within the second roller, the second pump being configured to move primer from the supply of primer into the volume within the second roller.

15. The primer applicator of claim 14 further comprising:

a piston having a first end and a second end, the first end being operatively connected to the actuator and the second end being fixedly mounted to the wall of the second roller within the volume formed by the wall of the second roller.

16. The primer applicator of claim 15 further comprising:

a controller operatively connected to the actuator, the controller being configured to:

identify a width of media to be printed in the cross-process direction; and operate the actuator to move the piston to position the second roller so a length of the stationary roller and a length of the second roller that extends beyond a terminal end of the stationary roller corresponds to the identified width of the media to be printed in the cross-process direction.

17. The primer applicator of claim 16 further comprising:

a second actuator operatively connected to the first end of the piston, the second actuator being configured to raise the second roller; and the controller being further configured to:

operate the second actuator to raise the second roller in response to the identified width of the media to be printed is equal to the length of the stationary roller.

18. The primer applicator of claim 17 wherein the length of the stationary roller is equal to a narrowest width of media in the cross-process direction to be printed by an inkjet printer.

19. The primer applicator of claim 18 further comprising:

a third actuator operatively to the stationary roller, the third actuator being configured to raise the stationary roller; and the controller being further configured to:

to identify positions of inter-document gaps between media sheets in a stream of media sheets being printed by the inkjet printer; and operate the second actuator and the third actuator to raise the second roller and the stationary roller, respectively, in response to the identified positions of the inter-document gaps passing the stationary roller and the second roller in a process direction.

20. The primer applicator of claim 19, the controller being operatively connected to the first pump and the second pump, the controller being configured to operate the first pump and the second pump independently of each other.

21. A method for operating an inkjet printer comprising:

operating a media transport to move a plurality of media sheets through a print zone opposite at least one printhead in a process direction;

supplying primer to a stationary roller positioned opposite the media transport and before the media sheets pass the at least one printhead; and moving a second roller bidirectionally in a cross-process direction over the media transport, the second roller being positioned opposite the media transport and before the media sheets pass the at least one printhead.

22. The method of claim 21 further comprising:

urging the primer through a first volume defined within the stationary roller and into a first cylinder of porous material mounted over a first plurality of perforations in the stationary roller; and urging the primer through a second volume defined within the second roller and into a second cylinder of porous material mounted over a second plurality of perforations in the second roller, the first and the second cylinders of porous material being configured to pull primer from the first volume and the second volume, respectively, to a surface of the first and the second cylinders of porous material.

23. The method of claim 22 wherein the porous material is porous XF neoprene, microcell, or porous EPDM.

24. The method of claim 23 further comprising:

operating a first pump to urge the primer through the first volume defined within the stationary roller and into the first cylinder of porous material mounted over the plurality of perforations in the stationary roller; and operating a second pump to urge the primer through the second volume defined within the second roller and into the second cylinder of porous material mounted over the second plurality of perforations in the second roller.

25. The method of claim 24 further comprising:

operating an actuator to move a piston having one end fixedly mounted to a wall of the second roller within the volume formed by the wall of the second roller.

26. The method of claim 25 further comprising:

identifying a width of media to be printed in the cross-process direction; and operating the actuator to move the piston to position the second roller so a length of the stationary roller and a length of the second roller that extends beyond a terminal end of the stationary roller corresponds to the identified width of the media to be printed in the cross-process direction.

27. The method of claim 26 further comprising:

operating a second actuator operatively connected to the first another end of the piston to raise the second roller in response to the identified width of the media to be printed is equal to the length of the stationary roller.

28. The method of claim 27 wherein the length of the stationary roller is equal to a narrowest width of media in the cross-process direction to be printed by an inkjet printer.

29. The method of claim 28 further comprising:

identifying positions of inter-document gaps between media sheets in a stream of media sheets being printed by the inkjet printer; and operating the second actuator and a third actuator operatively connected to the stationary roller to raise the second roller and the stationary roller, respectively, in response to the identified positions of the inter-document gaps passing the stationary roller and the second roller in a process direction.

30. The method of claim 29 further comprising:

operating the first pump and the second pump independently of each other.

* * * * *